(12) United States Patent
Sueyoshi et al.

(10) Patent No.: US 7,941,670 B2
(45) Date of Patent: *May 10, 2011

(54) DATA PROCESSING APPARATUS IN WHICH DATA IS ACCESSED IN RESPONSE TO AN ACCESS REQUEST FROM A PLURALITY OF ACCESS REQUEST SOURCES

(75) Inventors: Masahiro Sueyoshi, Kanagawa (JP); Kazuo Omori, Tokyo (JP); Akira Honjo, Tokyo (JP); Naofumi Hanaki, Kanagawa (JP); Katsuyuki Teruyama, Tokyo (JP); Tomohiko Nagayama, Tokyo (JP); Hideo Yamamoto, Kanagawa (JP); Yuji Hiura, Kanagawa (JP); Yoshiaki Hirano, Kanagawa (JP)

(73) Assignee: Sony Corporation, Tokyo (JP)

( * ) Notice: Subject to any disclaimer, the term of this patent is extended or adjusted under 35 U.S.C. 154(b) by 41 days.

This patent is subject to a terminal disclaimer.

(21) Appl. No.: 12/473,864

(22) Filed: May 28, 2009

(65) Prior Publication Data
US 2009/0235336 A1  Sep. 17, 2009

Related U.S. Application Data

(63) Continuation of application No. 11/017,823, filed on Dec. 22, 2004, now Pat. No. 7,555,653.

(30) Foreign Application Priority Data

Jan. 9, 2004  (JP) .................................. 2004-004824

(51) Int. Cl.
*G06F 21/00* (2006.01)
(52) U.S. Cl. ...................................................... 713/182
(58) Field of Classification Search .................... 713/182
See application file for complete search history.

(56) References Cited

U.S. PATENT DOCUMENTS

| 6,173,293 | B1 * | 1/2001 | Thekkath et al. ..................... 1/1 |
| 2004/0123112 | A1 * | 6/2004 | Himmel et al. ............... 713/182 |

FOREIGN PATENT DOCUMENTS

| EP | 1 335 286 A2 | 8/2003 |
| JP | 6-75862 | 3/1994 |
| JP | 2003-233520 | 8/2003 |

OTHER PUBLICATIONS

AFS User Guide, Version first edition, Japan: IBM Japan, Apr. 30, 2000, first edition, p. 1, p. 6, p. 12, p. 97.
Office Action issued Jan. 25, 2011, in Japanese Patent Application No. 2004-004824 (with English-language Translation).

* cited by examiner

*Primary Examiner* — Brandon S Hoffman
(74) *Attorney, Agent, or Firm* — Oblon, Spivak, McClelland, Maier & Neustadt, L.L.P.

(57) ABSTRACT

A data processing apparatus is provided which is capable of improving the responsiveness of communication in which only a maximum of one access request source has write authorization and the other access requests do not have write authorization when communication is performed with a plurality of access request sources. A management apparatus transmits, to a secure application module (SAM), a strong connection request requesting the obtainment of write authorization into the SAM. When it is determined that the strong connection has not already been assigned to the other management apparatuses, the SAM assigns the strong connection to the management apparatus in a state in which a weak connection having read authorization with the management apparatuses is maintained.

8 Claims, 11 Drawing Sheets

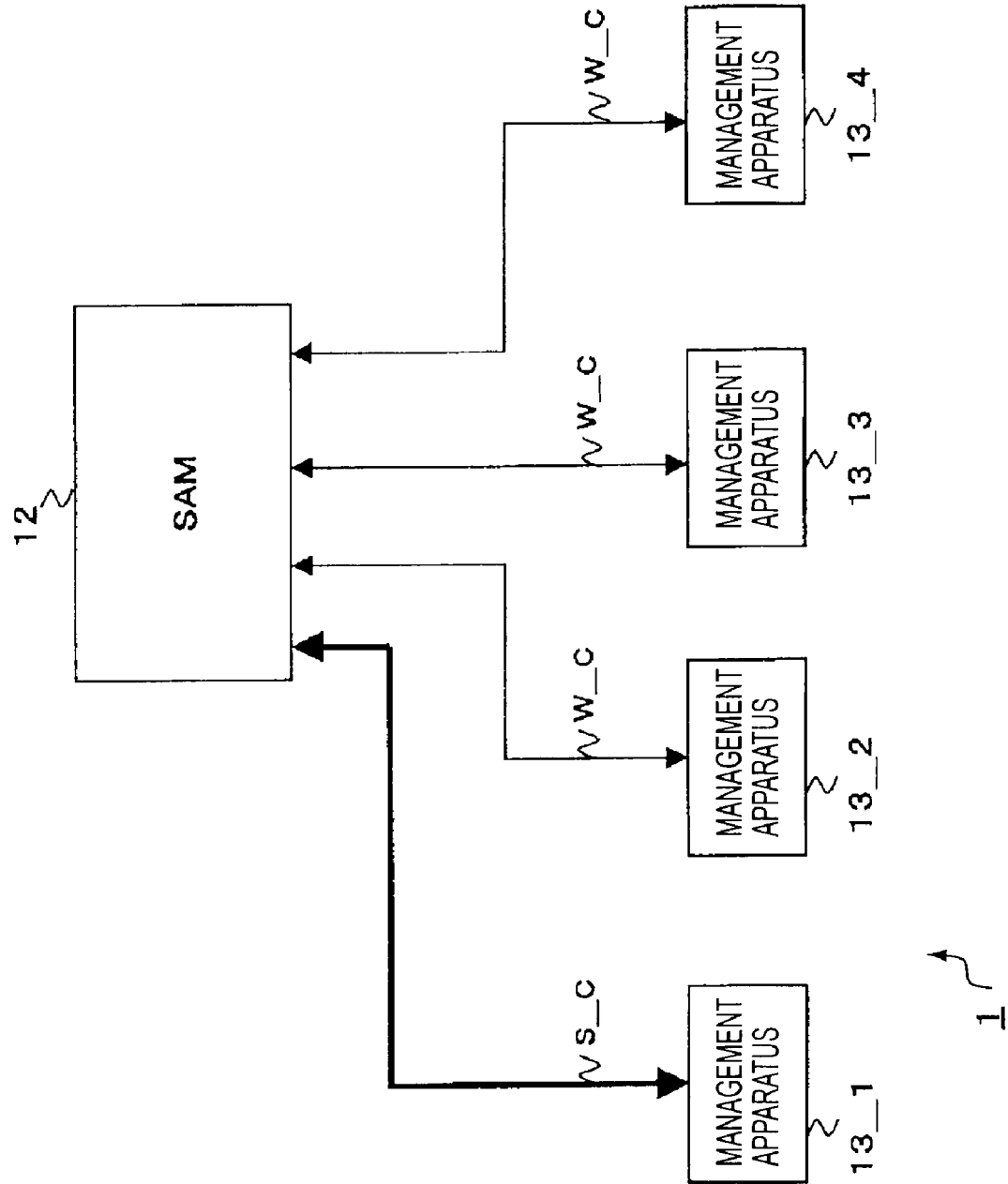

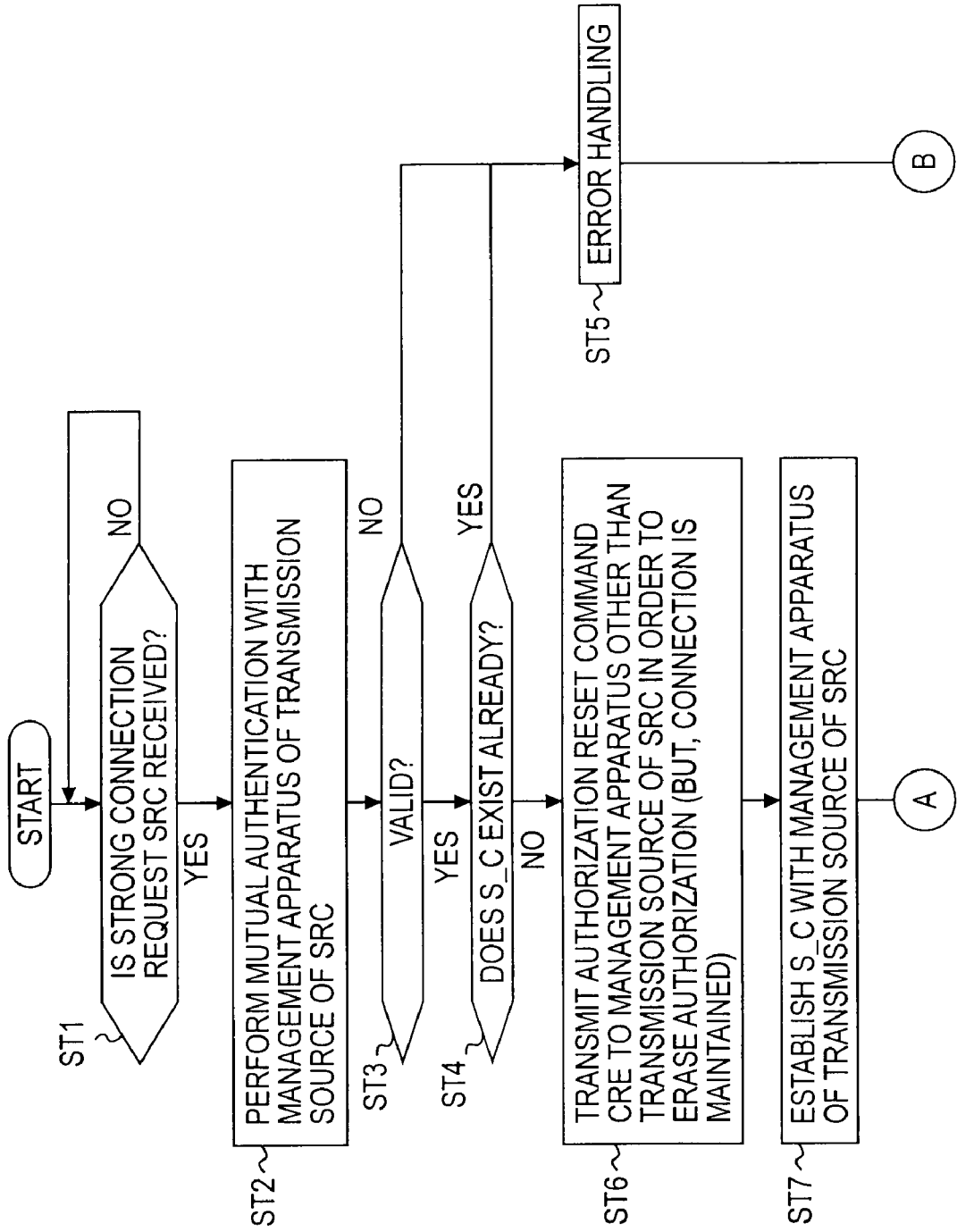

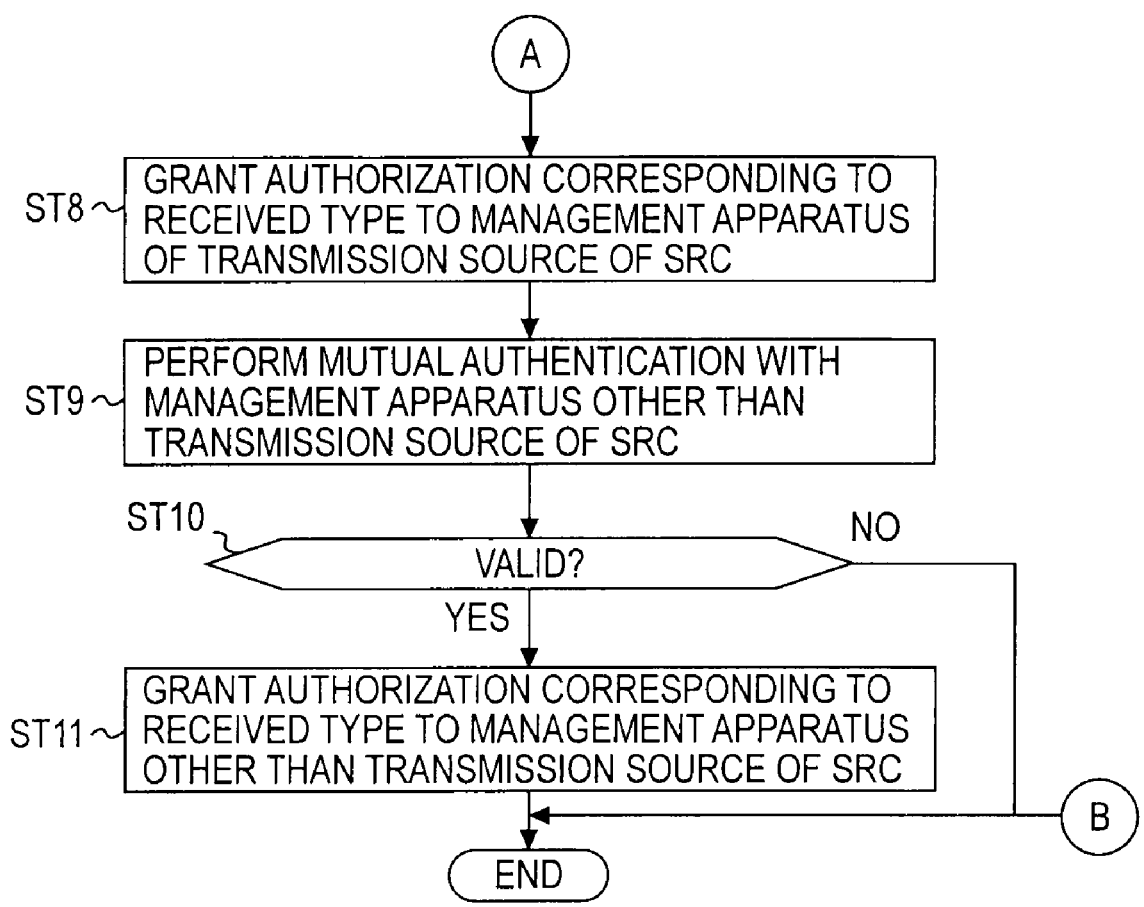

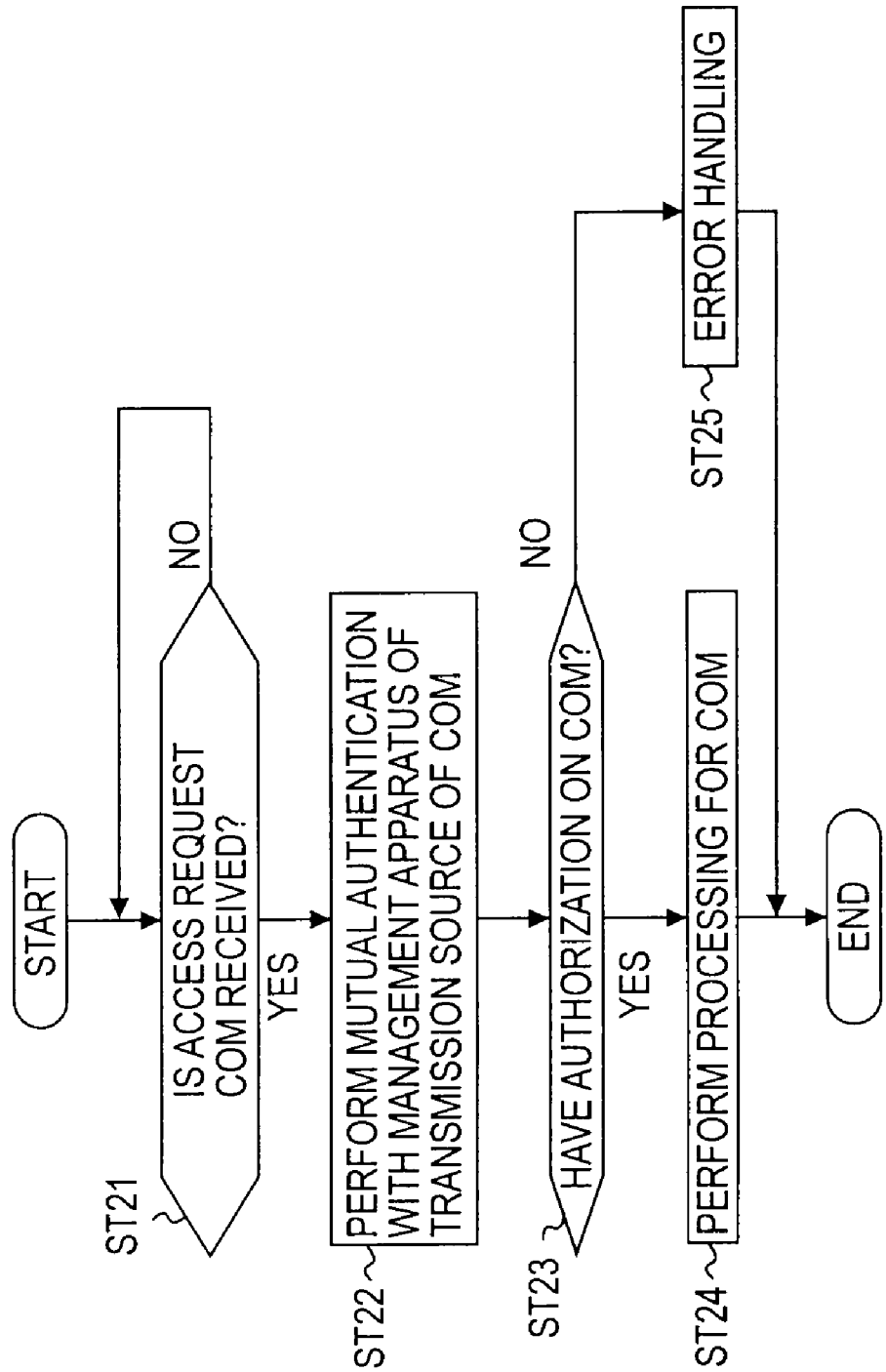

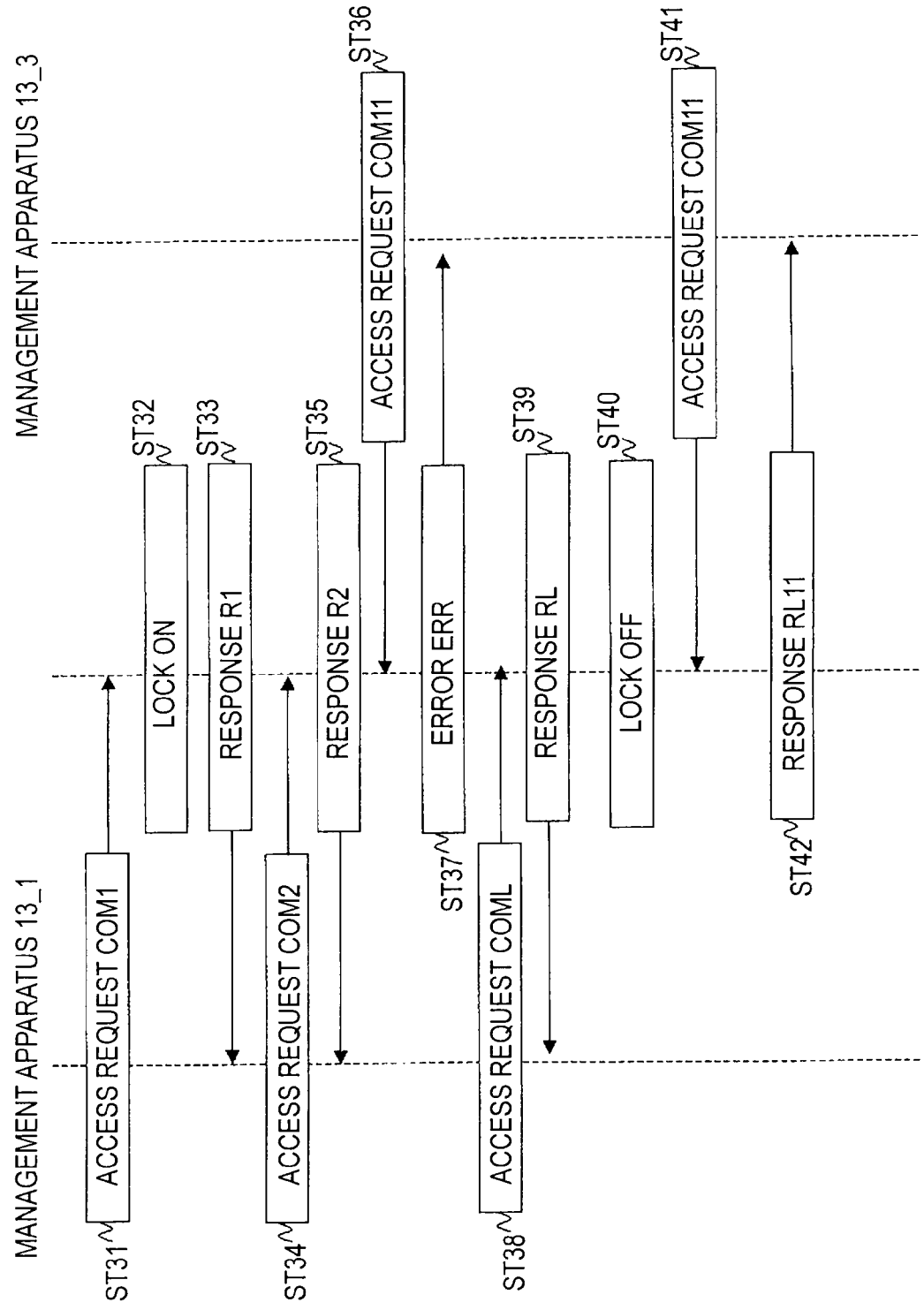

DATA PROCESSING APPARATUS IN WHICH DATA IS ACCESSED IN RESPONSE TO AN ACCESS REQUEST FROM A PLURALITY OF ACCESS REQUEST SOURCES

CROSS-REFERENCE TO RELATED APPLICATIONS

This application is a continuation of U.S. application Ser. No. 11/017,823, filed Dec. 22, 2004, issued Jun. 30, 2009 as U.S. Pat. No. 7,555,653, and is based upon and claims the benefit of priority from prior Japanese Patent Application No. 2004-004824 filed in the JPO on Jan. 9, 2004, the entire contents of each of which are incorporated herein by reference.

BACKGROUND OF THE INVENTION

1. Field of the Invention

The present invention relates to a data processing apparatus for writing data into a memory in response to an access request, a program for use therewith, and a method for use therewith.

2. Description of the Related Art

For example, a data processing apparatus for providing various kinds of services to a communication party after mutual authentication is performed with the communication party is known. Such a data processing apparatus has stored therein various setting data used for processing for the mutual authentication and services described above; for example, the above-described setting data is written into a plurality of management apparatuses. In such a data processing apparatus, in order that the writing of the above-mentioned setting data from a plurality of management apparatuses do not conflict with each other, when a writing request is received from one management apparatus, the connection with the other management apparatuses is disconnected, and the connection is established only with the management apparatus of the transmission source of the writing request.

However, in the above-described system, the data processing apparatus disconnects the connection with the other management apparatuses when the connection is established with only the management apparatus of the transmission source of the writing request. Therefore, when a request is received thereafter from the other management apparatuses, it is necessary to establish a connection again with the other management apparatuses, presenting the problem in that responsiveness is poor. Another problem is that, when the data processing apparatus is managed from management apparatuses that are disposed at a plurality of locations, in reality, however, only the management at one location can be guaranteed unless there is a guarantee for simultaneous writing.

SUMMARY OF THE INVENTION

The present invention has been made in view of such a situation. An object of the present invention is to provide a data processing apparatus capable of granting write authorization to a maximum of one access request source when communication is performed with a plurality of access request sources and increasing responsiveness of communication with the other access request sources that do not have write authorization, a program for use therewith, and a method for use therewith.

To achieve the above-mentioned object, in a first aspect, the present invention provides a data processing apparatus in which data is accessed in response to an access request from a plurality of access request sources, the data processing apparatus including: storage means for storing data; assignment means for assigning a connection having write authorization to the access request source in response to a connection request in which the write authorization is specified, which is received from the access request source, so that a maximum of one connection from among connections that are simultaneously assigned to the plurality of access request sources becomes a connection having the write authorization with respect to the storage means; and control means for permitting writing into the storage means in response to an access request on condition that the connection having the write authorization is assigned to the access request source when the access request associated with writing into the storage means is received from the access request source via the connection assigned to the access request source by the assignment means.

In the data processing apparatus in accordance with the first aspect of the present invention, the assignment means simultaneously may assign a connection having write authorization to the access request source in response to a connection request in which the write authorization is specified, which is received from the access request source, so that a maximum of one connection from among connections that are simultaneously assigned to the plurality of access request sources becomes a connection having the write authorization with respect to the storage means. The control means may permit writing into the storage means in response to an access request on condition that the connection having the write authorization is assigned to the access request source when the access request associated with writing into the storage means is received from the access request source via the connection assigned to the access request source by the assignment means.

In a second aspect, the present invention provides a program executed by a data processing apparatus in which data is accessed in accordance with an access request from a plurality of access request sources, the program including: a first procedure for assigning a connection having write authorization to the access request source in response to a connection request in which the write authorization is specified, which is received from the access request source, so that a maximum of one connection from among connections that are simultaneously assigned to the plurality of access request sources becomes a connection having the write authorization with respect to the storage means; and a second procedure for permitting writing into the storage means in response to an access request on condition that the connection having the write authorization is assigned to the access request source when the access request associated with writing into the storage means is received from the access request source via the connection assigned to the access request source in the first procedure.

In the program in accordance with the second aspect of the present invention, the first procedure may assign a connection having write authorization to the access request source in response to a connection request in which the write authorization is specified, which is received from the access request source, so that a maximum of one connection from among connections that are simultaneously assigned to the plurality of access request sources becomes a connection having the write authorization with respect to the storage means. The second procedure may permit writing into the storage means in response to an access request on condition that the connection having the write authorization is assigned to the access request source when the access request associated with writing into the storage means is received from the access request source via the connection assigned to the access request source in the first procedure.

In a third aspect, the present invention provides a data processing method executed by a data processing apparatus in which data is accessed in response to an access request from a plurality of access request sources, the data processing method including: a first step of assigning a connection having write authorization to the access request source in response to a connection request in which the write authorization is specified, which is received from the access request source, so that a maximum of one connection from among connections that are simultaneously assigned to the plurality of access request sources becomes a connection having the write authorization with respect to the storage means; and a second step of permitting writing into the storage mean in response to an access request on condition that the connection having the write authorization is assigned to the access request source when the access request associated with writing into the storage means is received from the access request source via the connection assigned to the access request source in the first step.

In the data processing method in accordance with the third aspect of the present invention, the first step may assign a connection having write authorization to the access request source in response to a connection request in which the write authorization is specified, which is received from the access request source, so that a maximum of one connection from among connections that are simultaneously assigned to the plurality of access request sources becomes a connection having the write authorization with respect to the storage means. The second step may permit writing into the storage means in response to an access request on condition that the connection having the write authorization is assigned to the access request source when the access request associated with writing into the storage means is received from the access request source via the connection assigned to the access request source in the first step.

According to the present invention, it is possible to provide a data processing apparatus capable of granting write authorization to a maximum of one access request source when communication is performed with a plurality of access request sources and increasing responsiveness of communication with the other access request sources that do not have write authorization, a program for use therewith, and a method for use therewith.

BRIEF DESCRIPTION OF THE DRAWINGS

FIG. 7 illustrates a case in which a strong connection is formed between the SAM and the management apparatus 13_1;

FIG. 8 is a flowchart illustrating an example of the operation when the SAM receives a strong connection request SCR from the management apparatus 13_1 in the initial state shown in FIG. 4;

FIG. 9 is a flowchart continuing from FIG. 8 illustrating the example of the operation when the SAM receives the strong connection request SCR from the management apparatus 13_1 in the initial state shown in FIG. 4;

FIG. 10 is a flowchart illustrating an example of the operation when the SAM receives an access request from the management apparatus shown in FIG. 1; and FIG. 11 illustrates a case in which one access request is formed by a plurality of access requests COM, which are continuously transmitted from the management apparatus 13_1 to the SAM 12.

DESCRIPTION OF THE PREFERRED EMBODIMENTS

A card system according to an embodiment of the present invention will be described below.

First Embodiment

Figure 1:
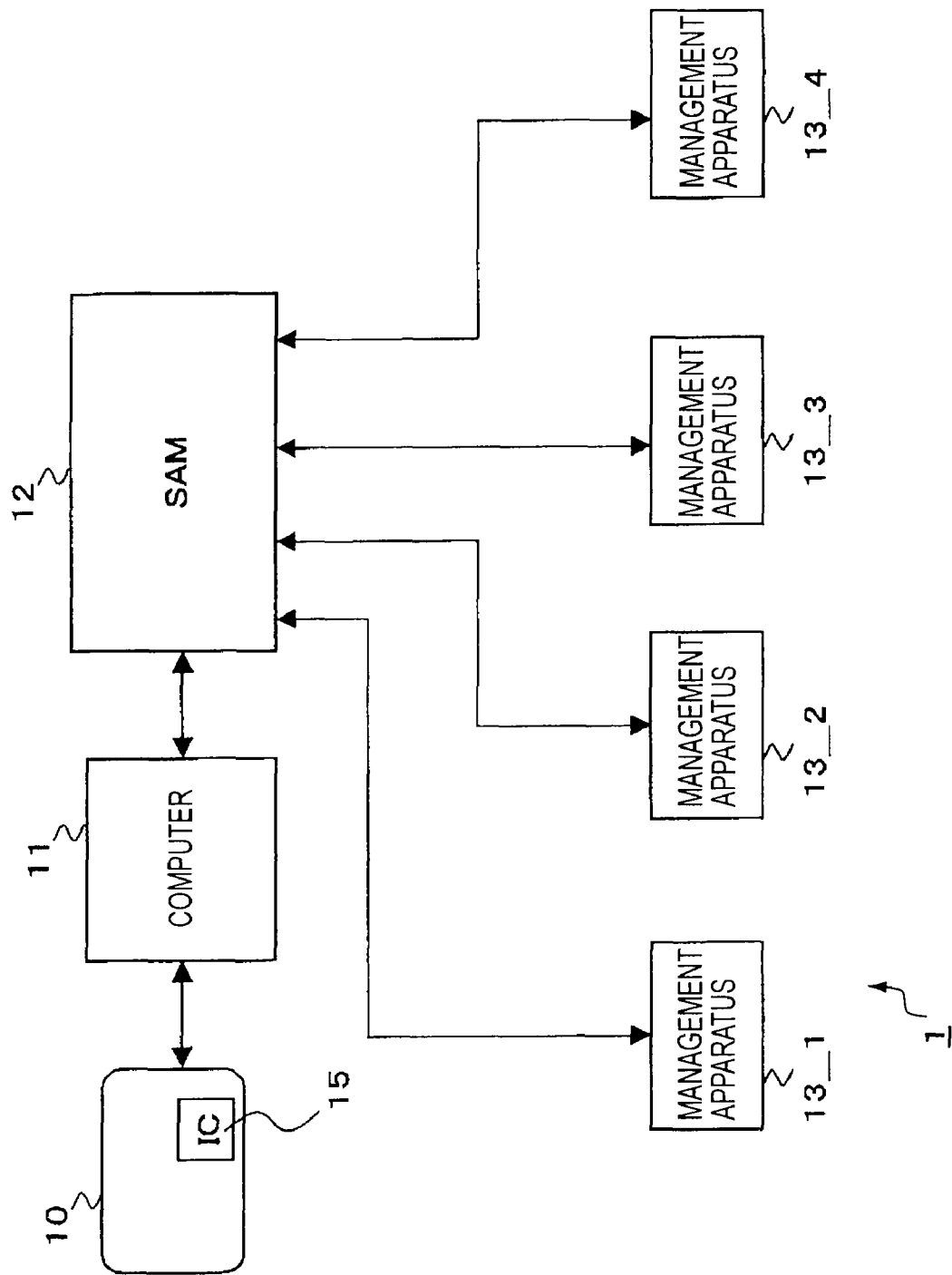
FIG. 1 is a block diagram of a card system according to a first embodiment of the present invention.

FIG. 1 is a block diagram of a card system 1 of a first embodiment of the present invention. As shown in FIG. 1, the card system 1 includes, for example, an IC card 10, a computer 11, a SAM (Secure Application Module) 12, and management apparatuses 13_1, 13_2, 13_3, and 13_4. The number of management apparatuses may be any number as long as it is plural. Here, the SAM 12 corresponds to a data processing apparatus of the present invention. Each of the management apparatuses 13_1 to 13_4 corresponds to an access request source of the present invention.

In the card system 1, for example, after an IC (Integrated Circuit) 15 of the IC card 10 and the SAM 12 perform authentication via a computer 11, they perform processing for predetermined services in cooperation. The SAM 12 has stored therein various kinds of setting data, such as key data, used for performing authentication between the IC card 10 and the IC 15 and for performing processing for the above-described services. The management apparatuses 13_1 to 13_4 write the various kinds of setting data to the SAM 12, and read the setting data from the SAM 12, so that the operation of the SAM 12 is managed. The card system 1 of this embodiment has features in the communication method between the SAM 12 and the management apparatuses 13_1 to 13_4.

Each component shown in FIG. 1 is described below.

[IC Card 10]

In the IC card 10, the IC 15 is incorporated.

The IC 15 is an anti-tampering electronic circuit having, for example, an incorporated memory, and an interface, and a CPU (Central Processing Unit), which is configured in such a manner that data stored in the incorporated memory and data being processed by the CPU cannot be externally monitored or tampered (difficult to tamper).

The IC 15 performs mutual authentication with the SAM 12 via the computer 11, and after the mutual validities are confirmed, the IC 15 performs processing for predetermined services in cooperation with the SAM 12.

[Computer 11]

The computer 11 has an interface for exchanging data with the IC 15 of the IC card 10, and an interface for exchanging data with the SAM 12.

[SAM 12]

Figure 2:
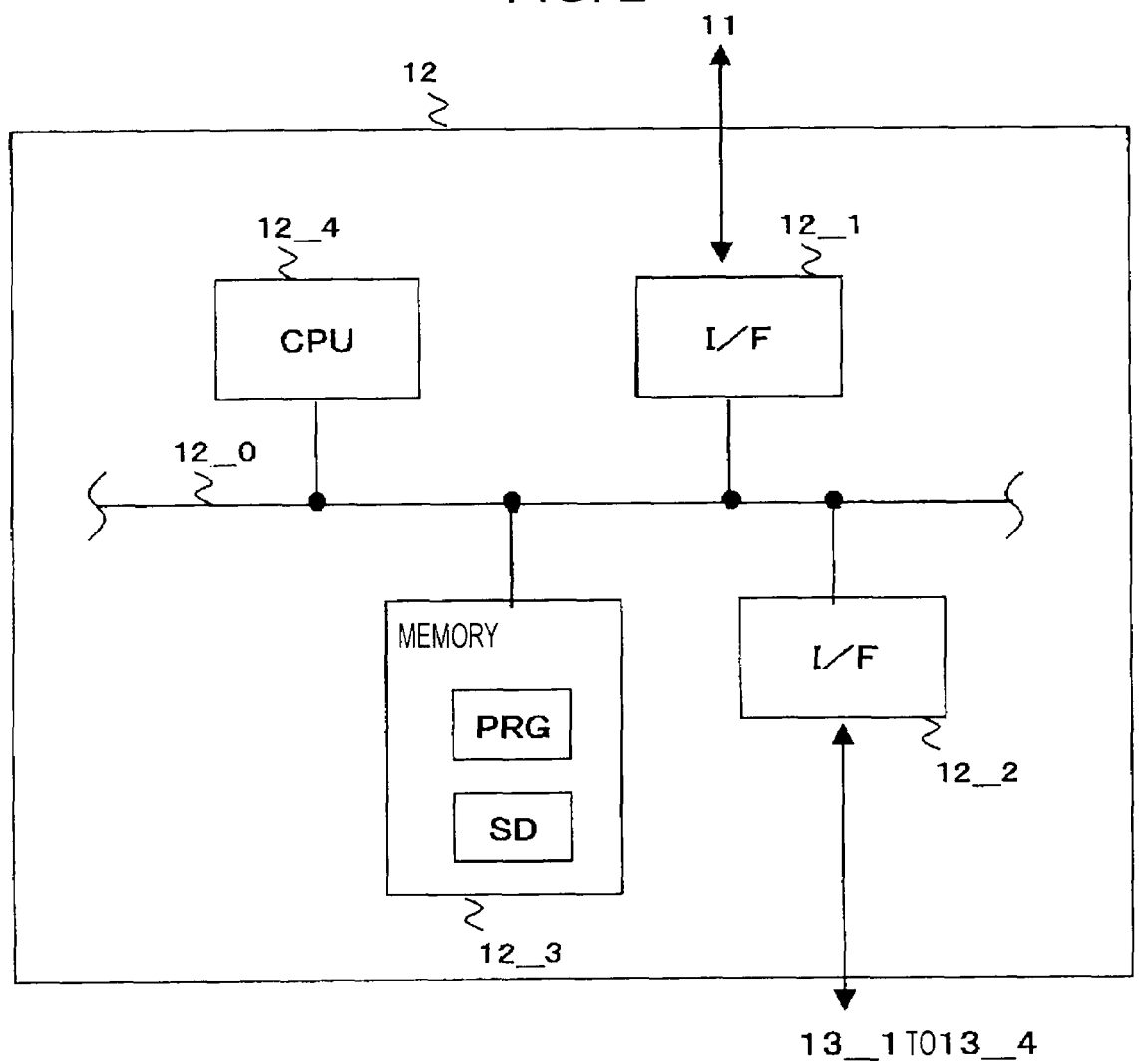
FIG. 2 is a block diagram of a SAM shown in FIG. 1.

FIG. 2 is a block diagram of the SAM 12 shown in FIG. 1. As shown in FIG. 2, the SAM 12 has, for example, interfaces 12_1 and 12_2, a memory 12_3, and a CPU 12_4, these being interconnected with one another via a data line 12_0.

Here, the memory 12_3 corresponds to the storage means of the present invention, and as will be described later, assignment means and control means of the present invention are realized by the CPU 12_4.

The SAM 12 is an anti-tampering electronic circuit, which is configured in such a manner that data stored in the memory 12_3 and data being processed by the CPU 12_3 cannot be externally monitored or tampered (difficult to tamper).

The interface 12_1 performs data input/output with the IC 15 via the computer 11 shown in FIG. 1. The interface 12_2 performs data input/output with the management apparatuses 13_1 to 13_4 shown in FIG. 1 via a network. The network is a network based on, for example, Ethernet (trademark), USB (Universal Serial Bus), or IEEE (Institute of Electrical and Electronics Engineers) 1394.

The interface 12_2 receives, from the management apparatuses 13_1 to 13_4, a connection request such as a strong connection request SCR and an access request COM (to be described later). Furthermore, the interface 12_2 transmits the data used for mutual authentication, etc., which is output by the CPU 12_4, to the management apparatuses 13_1 to 13_4.

The memory 12_3 has stored therein various kinds of setting data SD, such as key data, used for authentication between the IC card 10 and the IC 15 and for processing for the above-described services. In this embodiment, the management apparatuses 13_1 to 13_4 write (set) the setting data SD to the memory 12_3. Furthermore, the memory 12_3 has stored therein a program PRG that is read and executed by the CPU 12_4.

Figure 3:
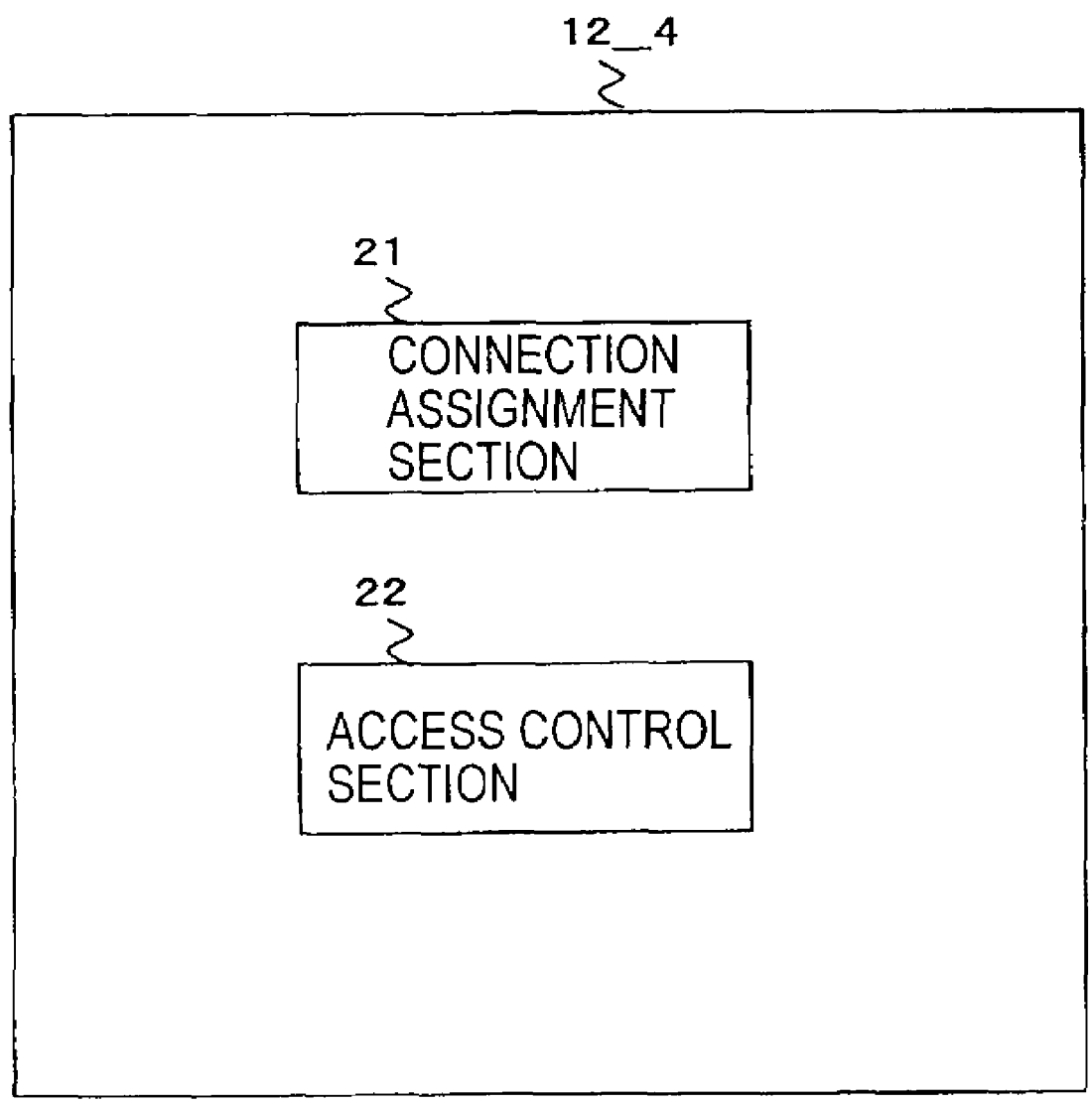
FIG. 3 illustrates functions realized by a CPU shown in FIG. 2.

The CPU 12_4 executes the program PRG read from the memory 12_3 so as to perform various kinds of processes (to be described later). In response to the execution of the program PRG, for example, the CPU 12_4 realizes the functions of a connection assignment section 21 and an access control section 22, as shown in FIG. 3.

Here, the connection assignment section 21 corresponds to the assignment means in accordance with the first aspect of the present invention, and the access control section 22 corresponds to the control means in accordance with the second aspect of the present invention.

Furthermore, based on the setting data SD stored in the memory 12_3, the CPU 12_4 performs authentication with the IC 15 of the IC card 10 and processing for services in cooperation with the IC 15 via the computer 11. The functions of the SAM 12 will be described in detail in association with an example of the operation of the card system 1 (to be described later).

[Management Apparatuses 13_1 to 13_4]

For each of the management apparatuses 13_1 to 13_4 shown in FIG. 1, a connection with the SAM 12 is assigned by issuing a connection request to the SAM 12 (a connection request of the present invention). Then, each of the management apparatuses 13_1 to 13_4 issues an access request (an access request of the present invention) to the SAM 12 via the assigned connection.

When the connection with the SAM 12 is made, each of the management apparatuses 13_1 to 13_4 transmits apparatus type data ASD indicating its own type (the data indicating the type of the access request source of the present invention) to the SAM 12. The apparatus type data ASD is verified together with the mutual authentication with each of the management apparatuses 13_1 to 13_4 in the SAM 12, and is used to define the execution authorization for the processing, which is granted in response to the access request from the management apparatus.

A description is given below of communication between the SAM 12 and the management apparatuses 13_1 to 13_4 in the card system 1 with emphasis on the operation of the SAM 12 shown in FIGS. 1 to 3.

Figure 4:
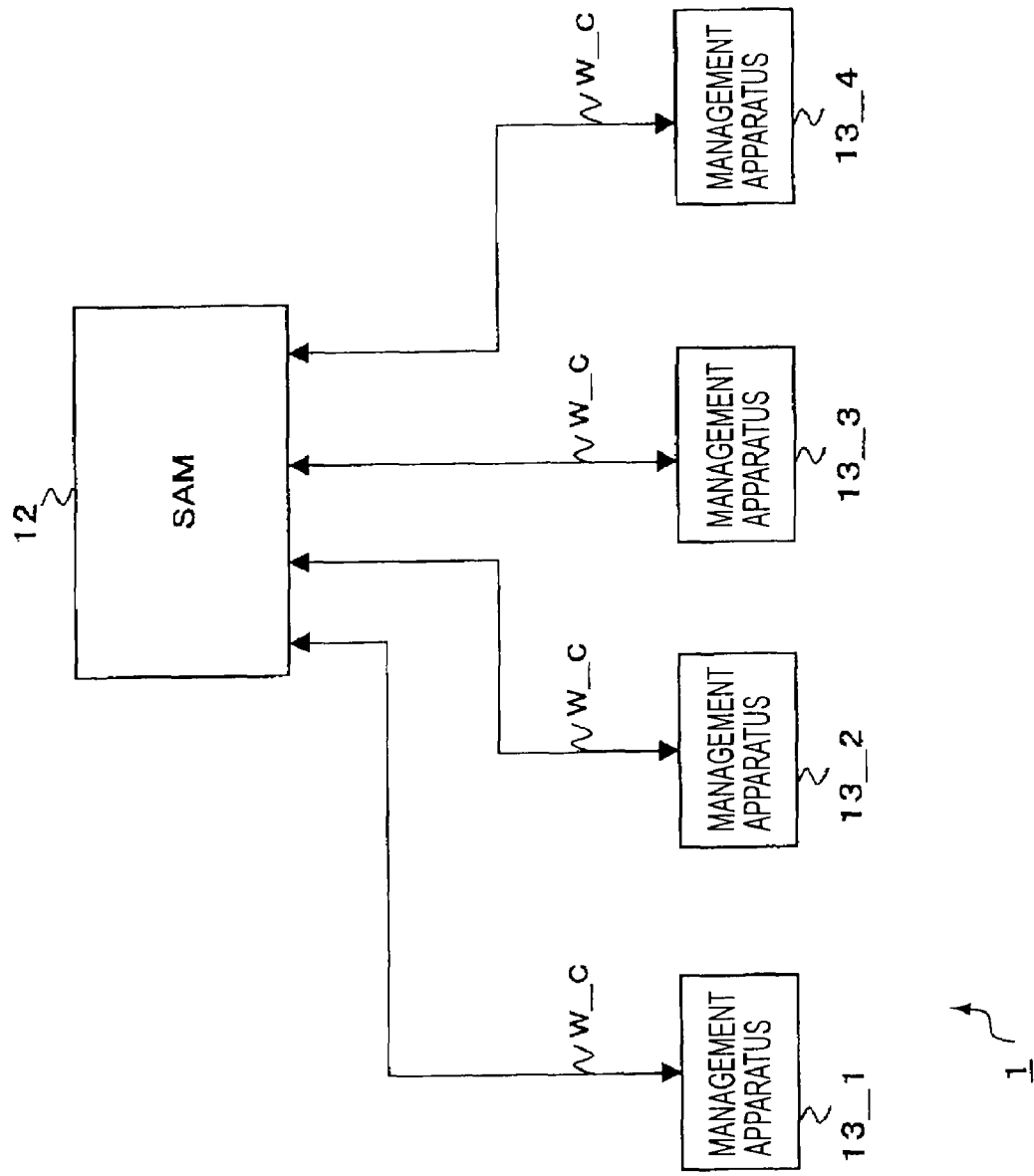
FIG. 4 illustrates an initial state of the connection between the SAM and management apparatuses shown in FIG. 1.

For example, a case is considered in which, as shown in FIG. 4, as the initial state, the SAM 12 assigns a weak connection W_C, in which write authorization is not assigned to the SAM 12, to each of the management apparatuses 13_1 to 13_4. Here, each of the management apparatuses 13_1 to 13_4 can transmit an access request COM requiring read authorization to the SAM 12 via the weak connection W_C, but cannot transmit an access request COM requiring write authorization.

Figure 5:
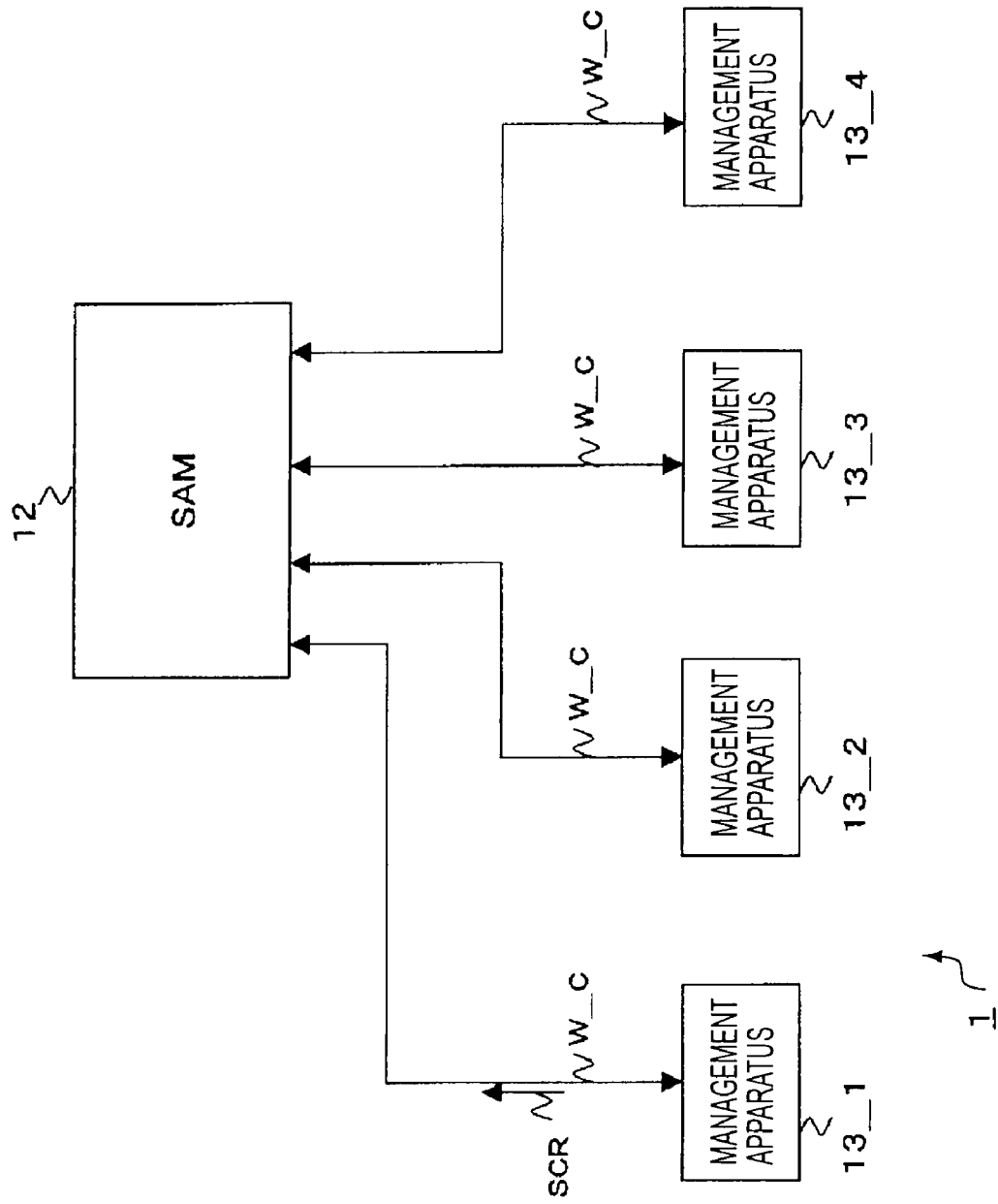
FIG. 5 illustrates a case in which a strong connection request is transmitted from the management apparatus shown in FIG. 1 to the SAM.

In the state shown in FIG. 4, as shown in FIG. 5, the management apparatus 13_1 transmits, to the SAM 12, a strong connection request SCR requiring an exclusive access to the SAM 12 (the obtainment of the write authorization with respect to the memory 12_3 of the SAM 12).

Upon receiving the strong connection request SCR, the SAM 12 performs mutual authentication with the management apparatus 13_1. When the validity is confirmed, then, the SAM 12 determines whether or not the strong connection S_C has already been assigned to the other management apparatuses 13_2, 13_3, and 13_4.

Figure 6:
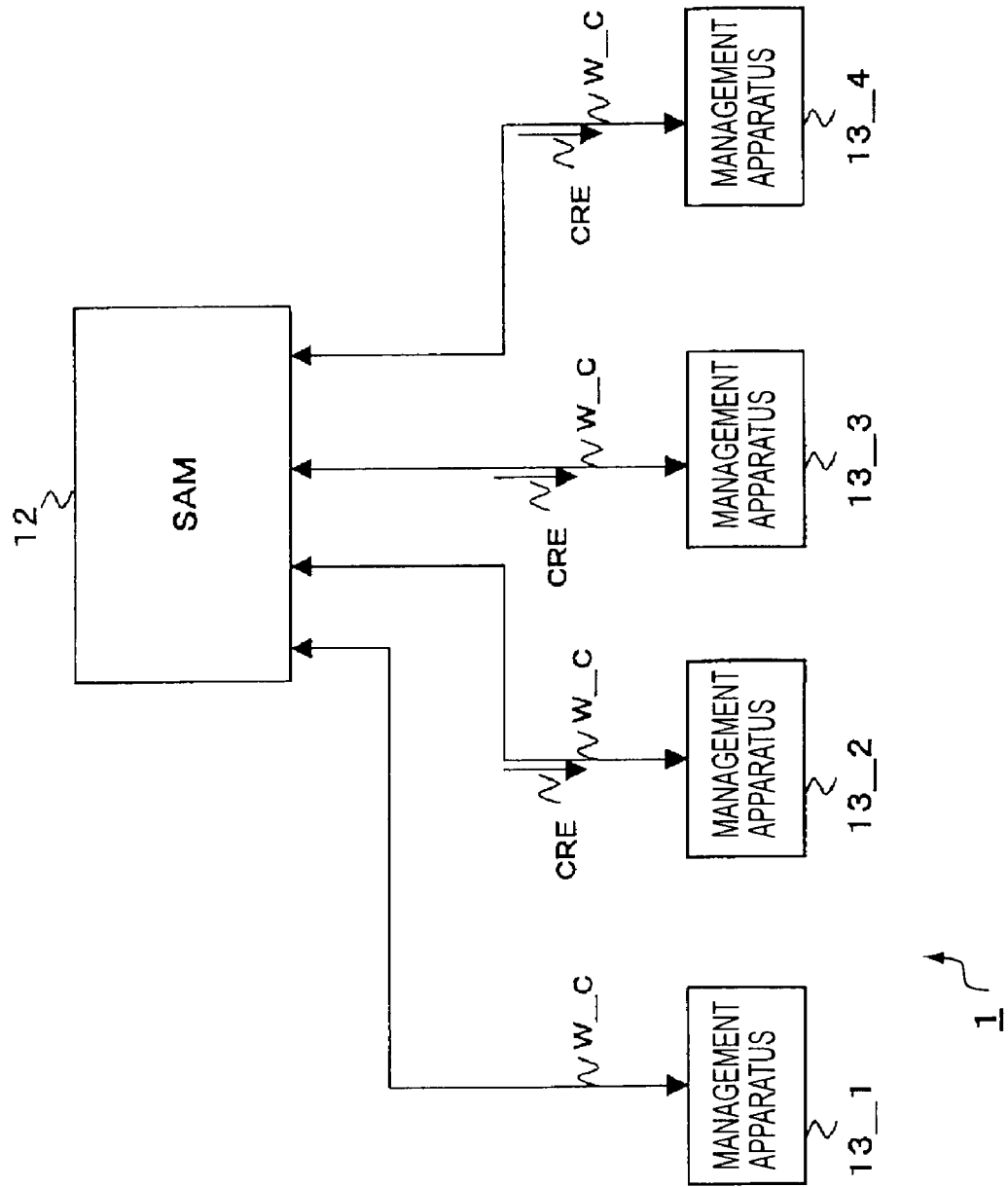
FIG. 6 illustrates a case in which a reset request is transmitted from the SAM shown in FIG. 1 to the management apparatuses 13_2, 13_3, and 13_4.

When it is determined that the strong connection S_C has not already been assigned to the other management apparatuses 13_2, 13_3, and 13_4, the SAM 12, as shown in FIG. 6, transmits a reset request CRE for resetting the authorization assigned to the other management apparatuses, to the other management apparatuses 13_2, 13_3, and 13_4 in the state in which the weak connection W_C with the other management apparatuses 13_2, 13_3, and 13_4 is maintained. As a result, the authorization for the processing that can be performed on the SAM 12 by the management apparatus on the basis of the access request COM, which has been assigned to the other management apparatuses 13_2, 13_3, and 13_4 by the SAM 12, is reset.

In this embodiment, the SAM 12 resets the authorization assigned to the associated management apparatus while the connection with the management apparatuses 13_2, 13_3, and 13_4 is maintained. For this reason, when the management apparatuses 13_2, 13_3, and 13_4 transmit the access request COM to the SAM 12, it is not necessary to perform a re-connection operation with the SAM 12, and the responsiveness is good.

Then, as shown in FIG. 7, the SAM 12 assigns the strong connection S_C to the management apparatus 13_1. As a result, the strong connection S_C is assigned to a maximum of one management apparatus from among the management apparatuses 13_1 to 13_4 by the SAM 12, and it can be guaranteed that writing based on the access request COM is performed to the memory 12_3 of the SAM 12 from only a single management apparatus.

A description will now be given below of an example of the operation for performing communication between the SAM 12 and the management apparatuses 13_1 to 13_4 in the card system 1 shown in FIGS. 1 to 7 with emphasis on the operation of the SAM 12.

[Example of First Operation]

In this example of the operation, a case is described in which the SAM 12 receives the strong connection request SCR from the management apparatus 13_1 in the initial state shown in FIG. 4.

FIGS. 8 and 9 are flowcharts illustrating an example of the operation when the SAM 12 receives the strong connection request SCR from the management apparatus 13_1 in the initial state shown in FIG. 4.

Each step shown in FIGS. 8 and 9 is performed by the connection assignment section 21 of the CPU 12_4 shown in FIG. 3. Each step shown in FIGS. 8 and 9 is written within a program PRG, and this constitutes the first procedure in accordance with the second aspect of the present invention. Each step shown in FIGS. 8 and 9 constitutes the first step in accordance with the third aspect of the present invention.

In step ST1, the CPU 12_4 of the SAM 12 determines whether or not the strong connection request SCR requiring an exclusive access to the SAM 12 (the obtainment of the write authorization to the memory 12_3 of the SAM 12) is received from the management apparatuses 13_1 to 13_4 via the interface 12_2. When it is determined that the strong connection request SCR is received, the process proceeds to step ST2.

In this example of the operation, a case is described below in which, as shown in FIG. 5, the SAM 12 receives the strong connection request SCR from the management apparatus 13_1.

In step ST2, the CPU 12_4 of the SAM 12 performs mutual authentication with the management apparatus 13_1, which is a transmission source of the strong connection request SCR in step ST1, in order to confirm the mutual validities.

In step ST3, when the CPU 12_4 of the SAM 12 confirms the mutual validities in step ST2, the process proceeds to step ST4, and when otherwise, the process proceeds to step ST5.

In step ST4, the CPU 12_4 of the SAM 12 determines whether or not the strong connection S_C has already been assigned to any of the management apparatuses 13_2, 13_3, and 13_4 other than the management apparatus 13_1. When it is determined that the strong connection S_C is not assigned, the process proceeds to step ST6. When it is determined that the strong connection S_C is assigned, the process proceeds to step ST5.

In step ST5, the CPU 12_4 of the SAM 12 transmits, via the interface 12_2, an error notification indicating that the strong connection S_C cannot be assigned to the management apparatus 13_1.

In step ST6, the CPU 12_4 of the SAM 12 transmits the reset request CRE for resetting the authorization assigned to the other management apparatuses via the interface 12_2 to the management apparatuses 13_2, 13_3, and 13_4 in the state in which the weak connection W_C with the management apparatuses 13_2, 13_3, and 13_4 is maintained. As a result, the authorization for the processing that can be performed on the SAM 12 on the basis of the access request COM by the associated management apparatus, the authorization being assigned to the management apparatuses 13_2, 13_3, and 13_4 by the SAM 12, is reset. As a result, the SAM 12 does not disconnect the weak connection W_C with the management apparatuses 13_2, 13_3, and 13_4, but maintains the weak connection W_C as is.

In step ST7, the CPU 12_4 of the SAM 12, as shown in FIG. 7, assigns the strong connection S_C to the management apparatus 13_1. As a result, the strong connection S_C is assigned to a maximum of one management apparatus from among the management apparatuses 13_1 to 13_4 by the SAM 12.

In step ST8, based on the apparatus type data ASD received from the management apparatus 13_1 via the interface 12_2, the CPU 12_4 of the SAM 12 grants an authorization for processing that can be performed on the SAM 12 by the management apparatus 13_1 by using the access request COM.

For example, the CPU 12_4 specifies as to whether or not the management apparatus 13_1 can issue the content (range) of the processing, for example, a predetermined request of a management system, to the SAM 12 by using the access request COM.

In step ST9, the CPU 12_4 of the SAM 12 performs mutual authentication with the management apparatuses 13_2, 13_3, and 13_4 via the interface 12_2.

In step ST10, when the CPU 12_4 of the SAM 12 confirms the mutual validities in step ST9, the process proceeds to step ST11. When otherwise, the processing is completed.

In step ST11, based on the apparatus type data ASD received from the management apparatuses 13_2, 12_3, and 12_4 via the interface 12_2, the CPU 12_4 of the SAM 12 grants an authorization for processing that can be performed on the SAM 12 by the management apparatuses 13_2, 13_3, and 13_4 on the basis of the access request COM. For example, the CPU 12_4 specifies the content (range) of the processing that can be requested to the SAM 12 by the management apparatuses 13_2, 13_3, and 13_4 by using the access request COM.

[Example of Second Operation]

A case is described below of an example of the operation in which the SAM 12 receives the access request COM from the management apparatuses 13_1 to 13_4.

FIG. 10 is a flowchart illustrating an example of the operation when the SAM 12 shown in FIG. 1 receives the access request COM from the management apparatuses 13_1 to 13_4. Each step shown in FIG. 10 is performed by the access control section 22 of the CPU 12_4 shown in FIG. 3. Each step shown in FIG. 10 is written within the program PRG, and this constitutes the second procedure of the program in accordance with the second aspect of the present invention. Furthermore, each step shown in FIG. 10 constitutes the second step in accordance with the third aspect of the present invention.

In step ST21, the CPU 12_4 of the SAM 12 determines whether or not the access request COM is received from any of the management apparatuses 13_1 to 13_4 via the connection assigned to the associated management apparatus (the strong connection S_C or the weak connection W_C). When it is determined that the access request COM is received, the process proceeds to step ST21.

In step ST22, the CPU 12_4 of the SAM 12 performs mutual authentication with the management apparatus of the transmission source of the access request COM received in step ST21, and determines whether or not the associated management apparatus has the authorization for the request specified in the access request COM.

In step ST23, when the CPU 12_4 of the SAM 12 determines in step ST22 that the associated management apparatus has the above-described authorization, the process proceeds to step ST24. When otherwise, the process proceeds to step ST25. At this time, when the access request COM requires write authorization, the CPU 12_4 determines that the associated management apparatus has the specified request only when the access request COM is received from the management apparatuses 13_1 to 13_4 via the strong connection S_C.

Furthermore, for example, when the access request COM that does not require write authorization is received from the management apparatuses 13_1 to 13_4 via the weak connection W_C, the CPU 12_4 determines that the associated management apparatus has an authorization regarding the specified request on condition that the associated management apparatus has a predetermined authorization with regard to the request specified by the access request COM.

In step ST24, the CPU 12_4 of the SAM 12 performs processing specified by the access request COM received in step ST21. When the access request COM is, for example, a reading request, the CPU 12_4 reads the setting data SD from the memory 12_3 shown in FIG. 2. When the access request COM is a writing request, the CPU 12_4 writes the setting data SD into the memory 12_3.

In step ST25, the CPU 12_4 of the SAM 12 transmits, to the management apparatus of the transmission source of the access request COM, an error notification indicating that there is no authorization for the processing specified by the access request COM.

As has thus been described, in the card system 1, the SAM 12 assigns the strong connection S_C to the management apparatus 13_1, and assigns the weak connection W_C to each of the management apparatuses 13_2 to 13_4.

The SAM 12 accepts the access request COM requiring write authorization into the memory 12_3 from only the management apparatus 13_1 to which the strong connection S_C is assigned, and accepts the access request COM that does not require write authorization from the management apparatuses 13_2 to 13_4 to which the weak connection W_C is assigned.

For this reason, according to the card system 1, when the SAM 12 receives the access request COM requiring write authorization from the management apparatus 13_1, it is not necessary for the SAM 12 to disconnect the connection with the management apparatuses 13_2 to 13_4, and the weak connection W_C can be maintained.

As a result, thereafter, it is possible for the SAM 12 immediately to receive the access request COM that does not require write authorization from the management apparatuses 13_2 to 13_4, and thus, a high responsiveness can be obtained.

Furthermore, in the card system 1, for example, when the SAM 12 assigns the strong connection S_C to the management apparatus 13_1 in response to the strong connection request SCR from the management apparatus 13_1, the SAM 12 maintains the weak connection W_C with the management apparatuses 13_2 to 13_4, but resets the authorization granted to the management apparatuses 13_2 to 13_4.

As a result, it is possible to newly grant an authorization to each of the management apparatuses 13_2 to 13_4 so that the security when the management apparatus 13_1 issues the access request COM to the SAM 12 via the strong connection S_C is ensured.

Furthermore, according to the SAM 12, based on the apparatus type data ASD received from each of the management apparatuses 13_1 to 13_4, an authorization matching the type of the associated management apparatus can be granted to the associated management apparatus.

Second Embodiment

A case is described below in which one access request is formed by a plurality of access requests COM transmitted continuously from the management apparatuses 13_1 to 13_4 to the SAM 12. The SAM 12 of this embodiment is the same as the SAM 12 described in the first embodiment except that the processing described below is further performed.

FIG. 11 illustrates a case in which one access request is formed by a plurality of access requests COM that are continuously transmitted from the management apparatus 13_1 to the SAM 12.

In this embodiment, for example, one access request is formed by access requests COM1, COM2, and COML shown in FIG. 11. Since an access request is useful when writing into and reading from the SAM 12 cannot be performed by one access request. In this embodiment, a description is given below of a case in which, in such a case, an access request COM11 is transmitted from the management apparatus 13_3 to the SAM 12 at the stage where responses by the SAM 12 to all of the plurality of access requests COM1, COM2, and COML are not completed.

In step ST31, the management apparatus 13_1 transmits the access request COM1 to the SAM 12.

In step ST32, the CPU 12_4 of the SAM 12 shown in FIG. 2 enters a locked-on state when the first access request COM1 is received via the interface 12_2 in step ST31.

In step ST33, the CPU 12_4 of the SAM 12 performs predetermined processing, for example, reading of the setting data SD from the memory 12_3 or writing of the setting data SD into the memory 12_3, in response to the access request COM1 received in step ST31, and transmits a response R1, which is a response of the above processing, to the management apparatus 13_1 via the interface 12_2.

In step ST34, the management apparatus 13_1 transmits the access request COM2 to the SAM 12.

In step ST35, in response to the access request COM1 received in step ST34, the CPU 12_4 of the SAM 12 shown in FIG. 2 performs predetermined processing, for example, reading of the setting data SD from the memory 12_3 or writing of the setting data SD into the memory 12_3, and transmits a response R2, which is a response of the above processing, to the management apparatus 13_3.

In step ST36, the management apparatus 13_3 transmits the access request COM11 to the SAM 12.

In step ST37, in response to the access request COM1 received in step ST36, the CPU 12_4 of the SAM 12 determines whether or not the CPU 12_4 is in a locked state. Since the CPU 12_4 is in a locked state, an error notification ERR indicating that the access request COM11 cannot be accepted is transmitted to the management apparatus 13_1.

In step ST38, the management apparatus 13_1 transmits the access request COML to the SAM 12.

In step ST39, in response to the access request COML transmitted in step ST38, the CPU 12_4 of the SAM 12 shown in FIG. 2 performs predetermined processing, for example, reading of the setting data SD from the memory 12_3 or writing of the setting data SD into memory 12_3, and transmits a response RL, which is a response of the above processing, to the management apparatus 13_1 via the interface 12_2.

In step ST40, the CPU 12_4 of the SAM 12 shown in FIG. 2 determines that the associated access request is the final one on the basis of predetermined identification data within the access request COML, and turns off the locked state set in step ST32 so as to enter a locked-off state.

In step ST41, based on the error notification ERR received in step ST37, the management apparatus 13_3 transmits the access request COM11 again to the SAM 12.

In step ST42, in response to the access request COM11 received in step ST41, the CPU 12_4 of the SAM 12 shown in FIG. 2 performs predetermined processing, for example, reading of the setting data SD from the memory 12_3 or writing of the setting data SD into the memory 12_3, and transmits a response R11, which is a response of the above processing, to the management apparatus 13_3 via the interface 12_2.

As has thus been described, in this embodiment, the SAM 12 does not accept the access request COM11 when the access request COM11 is transmitted later to the SAM 12 from the management apparatus 13_3 at the stage where the responses by the SAM 12 to all of the plurality of access requests COM1, COM2, and COML forming one access request are not completed. For this reason, the responsiveness to one access request formed by the plurality of the access requests COM1, COM2, and COML can be improved.

According to this embodiment, when one access request formed by the plurality of the access requests COM1, COM2, and COML is a request for reading the setting data SD and the access request COM11 is a request for writing the setting data SD, it is possible to prevent the setting data SD of the memory 12_3 of the SAM 12 from being changed in response to the writing request while the reading request is being processed.

Third Embodiment

In the above-described first embodiment, as shown in FIG. 10, after the SAM 12 performs mutual authentication with the management apparatuses 13_1 to 13_4 of the transmission source of the access request COM, the SAM 12 determines whether or not the associated management apparatus has an authorization regarding a request specified by the access request COM.

In this embodiment, before the access request COM is transmitted to the SAM 12, each of the management apparatuses 13_1 to 13_4 transmits, to the SAM 12, an inquiry as to whether or not the above-described execution authorization as a result of the mutual authentication, which was performed previously by the management apparatus on its own with the SAM 12, is held as is.

In response to the inquiry, the SAM 12 transmits a response indicating whether or not the execution authorization granted to the associated management apparatus as a result of the mutual authentication, that is, a response indicating whether or not the process of step ST6 shown in FIG. 8 is performed.

Based on the response received from the SAM 12, each of the management apparatuses 13_1 to 13_4 transmits the access request COM to the SAM 12, as is performed in step ST21 shown in FIG. 10, when the authorization is not lost.

According to this embodiment, each of the management apparatuses 13_1 to 13_4 can transmit the access request COM, as described in step ST21 of the FIG. 10, only when its own execution authorization is not lost. As a result, it is possible to prevent the SAM 12 from unnecessarily performing the processes of steps ST21, ST22, ST23, and ST25. In this case, each of the management apparatuses 13_1 to 13_4 does not enter an unwanted waiting state from when the access request COM is issued until an error notification is received in step ST25.

If the data processing apparatus is provided with a function capable of obtaining a mutual authentication state so as to operate in synchronization with the management apparatuses, an unwanted wait state can be avoided.

What is claimed is:

1. A data processing apparatus in which data is accessed in response to an access request from a plurality of access request sources, said data processing apparatus comprising:
a secure memory unit configured to store data;
assignment unit configured to assign a connection having write authorization to the access request source in response to a connection request in which said write authorization is specified, which is received from said access request source, so that a maximum of one connection from among connections that are simultaneously assigned to said plurality of access request source becomes a connection having said write authorization with respect to said secure memory unit;
a control unit configured to permit writing into said secure memory unit in response to an access request source when said access request associated with writing into said secure memory unit is received from the access request source via said connection assigned to said access request source by said assignment unit; and
an authentication unit configured to determine whether the access request source has the authorization for an access request, where the authentication unit performs authentication in response to each access request that is received from said access request source, the authentication unit performing authentication based on an apparatus type received from the access request source.

2. The data processing apparatus according to claim 1, wherein said assignment unit is configured to simultaneously assign a connection that does not have said write authorization and that has read authorization from said secure memory unit, to a single or a plurality of said access request sources other than said access request source to which a connection having said write authorization is assigned, and
said control unit is configured to permit reading of data from said secure memory unit when said access request associated with reading from said secure memory unit is received from the access request source via the connection having said read authorization assigned to said access request source by said assignment unit.

3. The data processing apparatus according to claim 1, wherein, based on data indicating the type of the access request source, which is received from said access request source, said control unit is configured to permit granting, to the access request source, an authorization for processing that can be performed using said access request, and when an access request is received from the access request source via the connection assigned to the access request source by said assignment unit, said control unit is configured to permit performing processing specified by the access request on condition that an authorization for processing specified by the access request is granted to the access request source.

4. The data processing apparatus according to claim 1, wherein said control unit is configured to permit granting an authorization for processing that can be performed using said access request to the access request source after the validity of said access request source is authenticated.

5. The data processing apparatus according to claim 1, wherein, when said assigning unit is configured to assign a connection having said write authorization to said access request source, said control unit is configured to permit resetting the authorization granted to said access request source to which another connection is assigned while the other connection assigned by said assignment unit is maintained.

6. The data processing apparatus according to claim 5, wherein, in response to a request from said access request source, said control unit is configured to permit transmitting, to the access request source, a reply indicating whether the authorization granted to the access request source is valid.

7. The data processing apparatus according to claim 1, wherein, when the request composed of said plurality of access requests is received from said access request source, said control unit is configured to permit accepting another access request after the processing for said plurality of access requests is completed, and performing processing for the other access request.

8. The data processing apparatus according to claim 7, wherein, if said other access request is received before the processing for said plurality of access requests is completed, the access request is rejected.

* * * * *